No. 869,947. PATENTED NOV. 5, 1907.
F. TUPPER.
SAW ATTACHMENT.
APPLICATION FILED MAR. 20, 1907.
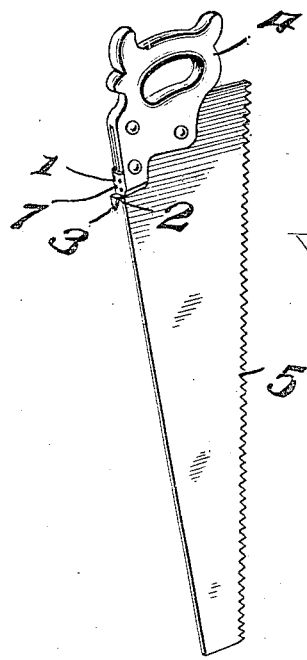
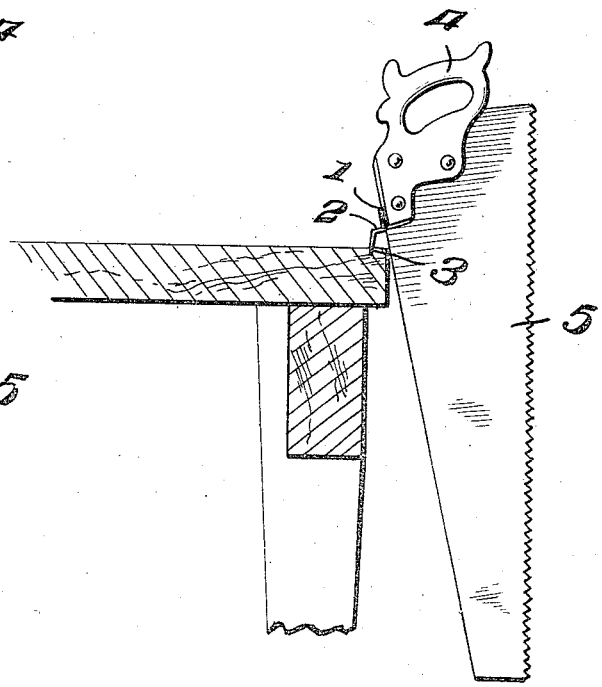
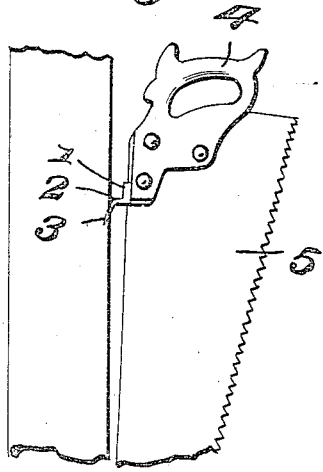
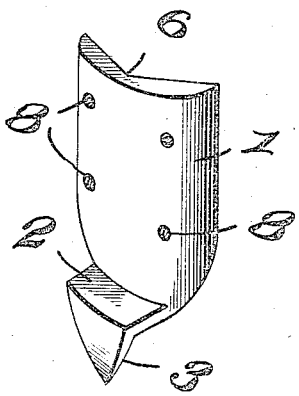
Inventor
F. Tupper
Witnesses
L. W. Anderson
By
W. J. Fitzgerald
Attorneys

UNITED STATES PATENT OFFICE.

FAY TUPPER, OF KINGSBURG, CALIFORNIA.

SAW ATTACHMENT.

No. 869,947.      Specification of Letters Patent.      Patented Nov. 5, 1907.

Application filed March 20, 1907. Serial No. 363,513.

*To all whom it may concern:*

Be it known that I, FAY TUPPER, a citizen of the United States, residing at Kingsburg, in the county of Fresno and State of California, have invented certain new and useful Improvements in Saw Attachments; and I do hereby declare the following to be a full, clear, and exact description of the invention, such as will enable others skilled in the art to which it appertains to make and use the same.

My invention relates to new and useful improvements in attachments for saws and more particularly to hand saws and my object is to provide means for securing the saw to an object when not in use and suspend the same in position to be readily grasped.

Other objects and advantages will be hereinafter referred to and more particularly pointed out in the claims.

In the accompanying drawings which are made a part of this application, Figure 1 is a perspective view of a hand saw showing my improved attachment secured thereto. Fig. 2 is a side elevation of a saw showing the same suspended from the edge of a work bench or the like. Fig. 3 is a perspective view of the attachment removed from the saw, and, Fig. 4 is a side elevation of the saw showing the same suspended from a vertically disposed object.

It has been found that a great deal of time is consumed in laying down and picking up a saw such as is commonly used by carpenters and it has also been found that by laying the saw upon the ground that the surface thereof will become rusted and that grit, etc., will collect upon the blade of the saw and dull the teeth thereof and in order to enable me to readily suspend the saw from an object so that the handle portion thereof will always be in readiness to be grasped and at the same time prevent the necessity of laying the saw upon the ground, I have provided my improved form of attachment which consists of a body portion 1 having an angular extension 2 at the lower end thereof, said extension being at right angles to the longitudinal plane of the body portion, and is provided with a tapered point 3, said tapered point depending from the angular extension so that the same may be readily forced into an object, such as the top of a work bench, fence post or other convenient object.

The body portion 1 is secured to the handle 4 of a saw 5 and is substantially concaved on its inner surface as best shown at 6 in Fig. 3 to fit the curved edge of the saw handle 4 and is secured in position upon the handle by disposing screws 7 or the like through openings 8 in the body portion 1 and into the edge of the handle 4 and it will be seen that when the device is so secured to the saw handle that by directing the tapered point 3 into an object, the saw will be thus supported until such time as it is again desired to use the saw, the tapered point being entered into the object by directing the point into engagement with the object and at the same time moving the saw downwardly.

It will thus be seen that I have provided a very cheap and economical means for supporting a saw when not in use and in conjunction with providing means for supporting the saw it will be seen that when the saw is used for ripping or sawing boards that when the tapered point is into engagement with the upper surface of the board and the saw released the saw will be prevented from tipping forwardly.

What I claim is:

1. An attachment for saws comprising a body having a concaved inner surface, apertures therein to receive fastening means, an extension at the lower end of said body and at right angles thereto and a tapered point depending from the outer end of said extension adapted to engage an object and support a saw.

2. An attachment for saws comprising a body having a concaved inner surface, a series of apertures through said body in substantially parallel lines, an extension at the lower end of said body and at right angles thereto and a tapered point depending downwardly from the outer end of said extension at an angle of a little more than 45 degrees, adapted to engage an object and support a saw.

In testimony whereof I have signed my name to this specification in the presence of two subscribing witnesses.

FAY TUPPER.

Witnesses:
   H. G. DREW,
   CRISS. W. TREMPER.